(12) United States Patent
Haugen et al.

(10) Patent No.: US 9,182,054 B2
(45) Date of Patent: Nov. 10, 2015

(54) APPARATUS AND METHOD OF LAYING AN ELONGATE ARTICLE FROM A VESSEL

(75) Inventors: Robert Haugen, Olso (NO); Johan Peter Schwartz, Eidsfoss (NO); Stener Døhlen, Blommenholm (NO); Gunnar Bolkesjø Herø, Vøyenenga (NO)

(73) Assignee: Kongsberg Oil & Gas Technologies AS, Sandvika (NO)

( * ) Notice: Subject to any disclaimer, the term of this patent is extended or adjusted under 35 U.S.C. 154(b) by 160 days.

(21) Appl. No.: 13/825,980

(22) PCT Filed: Sep. 30, 2011

(86) PCT No.: PCT/NO2011/000280
§ 371 (c)(1),
(2), (4) Date: Jun. 5, 2013

(87) PCT Pub. No.: WO2012/044179
PCT Pub. Date: Apr. 5, 2012

(65) Prior Publication Data
US 2013/0251456 A1    Sep. 26, 2013

(30) Foreign Application Priority Data

Sep. 30, 2010 (NO) .................................. 20101362
Oct. 27, 2010 (NO) .................................. 20101505
Jul. 7, 2011 (NO) .................................. 20110989

(51) Int. Cl.
*F16L 1/12* (2006.01)
*F16L 1/16* (2006.01)
(Continued)

(52) U.S. Cl.
CPC . *F16L 1/16* (2013.01); *B63B 35/03* (2013.01); *B63B 35/04* (2013.01); *F16L 1/18* (2013.01); *F16L 1/203* (2013.01); *F16L 1/23* (2013.01)

(58) Field of Classification Search
CPC ................. F16L 1/12; F16L 1/14; F16L 1/15; F16L 1/16; F16L 1/20; F16L 1/23; F16L 1/202; F16L 1/203; F16L 1/207; B63B 35/03
USPC .................. 405/158, 166, 184.4, 168.3, 168.4
See application file for complete search history.

(56) References Cited

U.S. PATENT DOCUMENTS

| | | | |
|---|---|---|---|
| 5,346,333 A | 9/1994 | Maloberti et al. | |
| 6,554,538 B2* | 4/2003 | Stockstill | 405/168.3 |
| 2003/0138297 A1* | 7/2003 | Stockstill | 405/158 |

FOREIGN PATENT DOCUMENTS

| | | |
|---|---|---|
| CN | 85105011 A | 12/1986 |
| CN | 2185727 Y | 12/1994 |

(Continued)

OTHER PUBLICATIONS

Office Action issued in counterpart Chinese Patent Application No. 2011800478234 dated Jul. 25, 2014 (11 pages).

(Continued)

*Primary Examiner* — Doug Hutton, Jr.
*Assistant Examiner* — Patrick Lambe
(74) *Attorney, Agent, or Firm* — Osha Liang LLP

(57) ABSTRACT

An apparatus for feeding an elongate article (6) from a floating vessel and suspending a first portion (6a) of the elongate article in a body of water below the vessel, comprises a cylindrical body (10) rotatably supported on the vessel and driving means (85, 86) for controlling the rotation of the cylindrical body. The cylindrical body (10) further comprises a spooling-on region (P) and a spooling-off region (U) for the elongate article, and a cylindrical contacting surface (18) for interaction with at least a portion of the elongate article (6); the contacting surface (18) being configured so as to support the first portion (6a).

22 Claims, 20 Drawing Sheets

(51) Int. Cl.
*F16L 1/18* (2006.01)
*F16L 1/20* (2006.01)
*F16L 1/23* (2006.01)
*B63B 35/03* (2006.01)
*B63B 35/04* (2006.01)

(56) References Cited

FOREIGN PATENT DOCUMENTS

| CN | 101715408 A | 5/2010 |
| CN | 201566810 U | 9/2010 |
| WO | 03/004915 A1 | 1/2003 |

OTHER PUBLICATIONS

Office Action issued in counterpart Australian Patent Application No. 2011307963 dated Sep. 22, 2014 (5 pages).

International Search Report issued in PCT/NO2011/000280 mailed Nov. 22, 2011 (2 pages).

Written Opinion issued in PCT/NO2011/000280 mailed Nov. 22, 2011 (6 pages).

* cited by examiner

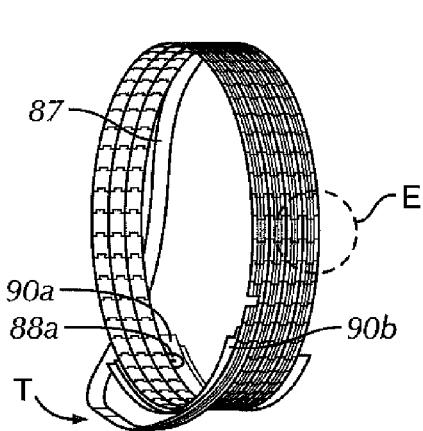
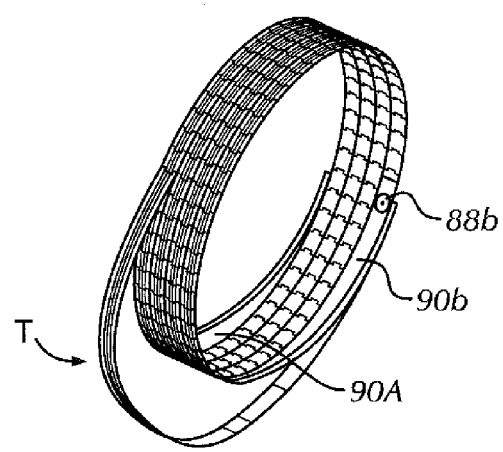
FIG. 38              FIG. 39
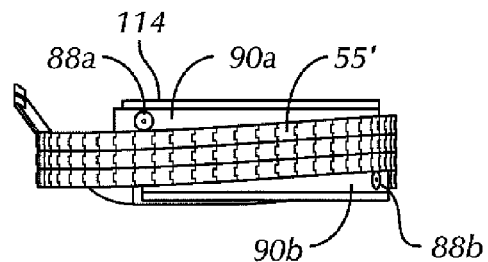
FIG. 40
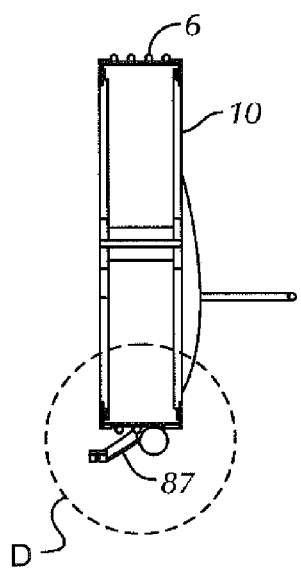
FIG. 41
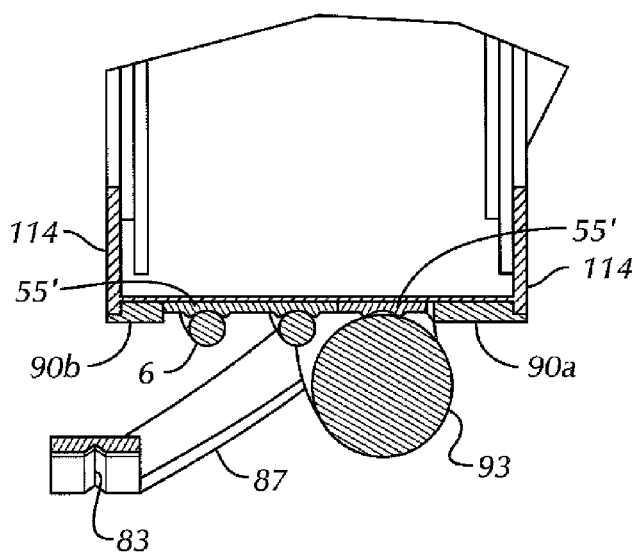
FIG. 42 ly, the invention relates to the laying of elongate
APPARATUS AND METHOD OF LAYING AN ELONGATE ARTICLE FROM A VESSEL

FIELD OF THE INVENTION

The invention relates to apparatuses and methods for use in the laying of elongate articles from a vessel at sea. More specifically, the invention relates to the laying of elongate articles such as rigid pipes, flexible pipes, risers, flowlines, pipelines, umbilicals and cables.

BACKGROUND OF THE INVENTION

The state of the art includes WO 03/004915 (Stockstill), which describes a pipeline laying ship with hull and a deck area that supports pipe reels. A pipe joint storage area is provided for containing multiple joints of pipe. One or more pipeline welding stations are provided on the deck next to the reels, the pipeline welding stations being positioned to join the joints of pipe together to form an elongated pipeline that can be wound up on a selected reel. A tower is provided for guiding the pipeline as it is unwound from the reel, and the tower includes a bend controller, a straightener and a tensioner. The tensioner carries the weight of the pipeline between seabed and vessel. The tower can be positioned aft for launching the pipeline from the hull stern, and amidships for launching the pipeline through a vertical hull opening (so-called "moon pool").

The state of the art also includes U.S. Pat. No. 5,346,333 (Maloberti, et al.), which describes a ship for laying flexible conduits on an ocean floor by continuous unrolling of the conduit at a laying site from at least one supply ship to the laying ship, wherein the flexible conduit is gradually transferred from the supply ship to a storage means located on the laying ship. The laying ship and the supply ship are equipped with means for storing flexible conduits. The laying ship comprises dynamic positioning means, a storage reel of flexible tubular conduit, and a tower positioned above a moon pool and having i.a. a radius controller and tensioners. The radius controller (guide means) comprises a chute making it possible for flexible tubular conduit to take a vertical path in the tower, towards the tensioners. The tensioners are placed below the chute, for example two tensioners are mounted on the tower of approximately parallelepipedic rectangular shape, in series. The tensioners are placed vertically "downstream" from the chute and "upstream" of a work table. The tensioners support the weight of flexible tubular conduit as it is suspended between the ship and the ocean floor. The tensioners comprise a plurality of tracks (caterpillar tracks), which exert a tightening force on the tubular conduit. The simultaneous advance of the tensioners tracks exert a tightening force on the tubular conduit, making possible the lowering of the tubular conduit to the seabed.

The state-of-the-art ships rely on the interaction between—and synchronization of—multiple tensioners in a tower in order to control the laying process. Operations at larger sea depths require more tensioner holding power, which in turn requires larger and taller towers on the laying vessels.

The present applicant has devised and embodied this invention to overcome the shortcomings of the prior art and to obtain further advantages.

SUMMARY OF THE INVENTION

The invention is set forth and characterized in the main claims, while the dependent claims describe other characteristics of the invention.

It is thus provided an apparatus for feeding an elongate article from a floating vessel and suspending a first portion of the elongate article in a body of water below the vessel, characterized by a cylindrical body rotatably supported on the vessel and comprising driving means for controlling the rotation of the cylindrical body; the cylindrical body further comprising a spooling-on region and a spooling-off region for the elongate article, and a cylindrical contacting surface for interaction with at least a portion of the elongate article either directly or via a plurality of support elements; the contacting surface being configured so as to support the first portion, and first tensioner means for the elongate article to be spooled onto the cylindrical body, arranged on the vessel between the spooling-on region and a storage area for the elongate article.

In one embodiment, the contacting surface extends a distance in the axial direction of the cylindrical body of a magnitude which allows multiple turns of the elongate article to be wound around the contacting surface.

In one embodiment, the apparatus further comprises second tensioner means for the elongate article to be spooled off of the cylindrical body, arranged on the vessel proximate to the spooling-off region. The second tensioner means may be movable in the cylindrical body axial direction.

The contacting surface may comprise a friction-enhancing material. In one embodiment, the axis of rotation of the cylindrical body is substantially horizontal. In one embodiment, a guiding apparatus is arranged on the vessel proximate to at least a part of the contacting surface, arranged and configured for controlling the movement of the elongate article between the spooling-on region and the spooling-off region in a cylindrical body axial direction.

The guiding apparatus may comprise individual guiding means for each turn of the elongate article around the contacting surface.

In one embodiment, the guiding apparatus comprising individual guiding channels for at least a number of the turns of the elongate article around the contacting surface.

In one embodiment, the guiding means comprise guiding vanes extending to within a distance from the contacting surface. The guiding means may comprise friction reducing means. In one embodiment, the guiding means comprise lifting means for lifting the portion of the elongate article which is subjected to the guiding means off from the contacting surface, and subsequently allowing the elongate article to resume contact with the contacting surface.

The guiding vanes are arranged and configured such that they fulfil their guiding function even if the cylinder rotates "backwards", i.e. in a winding or retrieval mode. Alternatively, the guiding unit may be turned around.

In one embodiment, the apparatus comprises traction means for the elongate article, arranged at intervals around the cylindrical body. In one embodiment, the traction means comprise a plurality of ridges, releasably arranged on the contacting surface, whereby at least a portion of the outer structure of the elongate article is elastically deformed when subjected to the ridges when the apparatus is in operation. The ridges are in one embodiment arranged parallel with the cylindrical body axis of rotation. In another embodiment, the ridges are arranged with a skew angle with the cylindrical body axis of rotation.

In one embodiment, the contacting surface comprises a plurality of receptacles arranged around the circumference of the cylindrical body, said receptacles being configured for releasably receiving a plurality of support elements for the elongate article. Each support element is configured for supporting at least a portion of the elongate article.

In one embodiment, a plurality of support elements are interconnected to form an endless belt which is wrapped a number of turns around the cylindrical body. Preferably, the apparatus further comprises first and second guide funnels for the endless belt, said guide funnels being arranged proximate to the cylindrical body and an axial distance apart, whereby the endless belt temporarily is lifted off cylindrical body and moved in the cylindrical body axial direction before it is re-attached to the cylindrical body.

In one embodiment the apparatus comprises a plurality of support elements configured for arrangement on the surface and for providing support for the elongate article. The support elements are connected in an end-to-end relationship to form an endless belt wrapped a plurality of turns around the cylindrical body, and the apparatus further comprises a take-off section where a portion of the belt is temporarily lifted off the surface by means of a guide structure, shifted in an axial direction of the cylindrical body, and brought back to the surface. Rotatable guiding means are arranged in relation to the surface and configured for pushing a portion of the belt in said axial direction when the cylindrical body is rotating; and the guiding means are arranged in the region of the take-off section.

In one embodiment, each support element comprises a v-shaped profile for supporting at least a part of the elongated article.

In one embodiment, wherein the spooling-on region and the spooling-off region are one the same side of the cylindrical body's axis of rotation.

It is also provided a vessel for laying an elongate article, comprising a hull and a deck, and further characterized by a cylindrical body rotatably supported on the vessel and comprising driving means for controlling the rotation of the cylindrical body; the cylindrical body further comprising a spooling-on region and a spooling-off region for the elongate article, and a cylindrical contacting surface for interaction with at least a portion of the elongate article; the contacting surface being configured so as to support the first portion.

The vessel comprises in one embodiment a deck opening through which a first portion is passed, said first portion being suspended by the cylindrical body. The vessel advantageously comprises the apparatus according to the invention.

In one embodiment, the vessel comprises an alignment-and-radius-control unit arranged proximate to a first tensioner.

The vessel advantageously comprises a storage area for a plurality of storage spools for portions of the elongate article, upstream of the spooling-on region.

It is also provided a method of laying an elongate article from a vessel, comprising the steps of:
a) arranging a section of the elongate article around a cylindrical body rotatably supported on the vessel;
b) feeding a first portion of the elongate article into a body of water below the vessel and suspending said first portion by the cylindrical body; and
c) rotating the cylindrical body so as to lower the elongate article into the water.

In one embodiment, step a comprises the winding of the elongate article a number of turns around a cylindrical contacting surface on the cylindrical body.

In one embodiment of the method, the elongate article is spooled off of one of a plurality of storage spools on a deck area on the vessel and onto the cylindrical body, without intermediate storage.

In one embodiment, an endless belt of cradles is wound a number of turns around the cylindrical body, providing support for the elongate article. The method comprises in one embodiment a temporary removal of the belt off of the cylindrical boy at a take-off section.

In one embodiment, the method further comprises the use of a guiding apparatus to effect a controlled movement of the portion of the elongate article which is wound onto the contacting surface, said movement being in the axial direction of the cylinder and at increments per rotation of the cylindrical body which corresponds to the transverse dimension, such as the outer diameter, of the elongate article.

A greater flexibility is achieved with the invention, compared to the prior art, in that the pipe storage spools may be used directly; there is no need to transfer the flexible pipe onto an on-board reel or spool before deployment. The cylinder according to the invention also eliminates the need for the tall tower which is necessary in the prior art laying vessels. The single-unit cylinder arrangement is advantageous, compared to the tall tower with its plurality of tensioners of the prior art.

The cylinder and guiding apparatus according to the invention also facilitates a hoisting of elongate articles, from the water and into the laying ship, i.e. a process which is reverse of the laying procedure.

BRIEF DESCRIPTION OF THE DRAWINGS

These and other characteristics of the invention will be clear from the following description of a preferential form of embodiment, given as a non-restrictive example, with reference to the attached drawings wherein:

FIGS. 35a and 35b are partly transparten in order to illustrate internal cannels and attachment lines;

FIGS. 38 and 39 are different perspective views of the belt of cradles as shown in FIG. 36;

FIG. 40 is a top view of the configuration shown in FIGS. 38 and 39;

FIG. 41 is a sectional view of the reel and belt of cradles as illustrated in FIG. 37;

FIG. 42 is an enlargement of the area marked "D" in FIG. 41;

DETAILED DESCRIPTION OF A PREFERENTIAL EMBODIMENT

The skilled person will know the distinction between flexible pipes and rigid pipes. While flexible pipes have a relatively short minimum bend radius without plastic deformation (e.g. of the order of a few meters), rigid pipes have a minimum bend radius without plastic deformation which is relatively large (e.g. of the order of several tens of meters). While this description refers to the general term "flexible pipe", it should be understood that such term covers not only true flexible tubular pipes, but also flexible risers, umbilicals and the flexible cables that a laying vessel may have to lay. The skilled person will understand that the invention is applicable also for the installation of rigid pipes, and that a reverse bending straightener in such case may be required.

Figure 1:
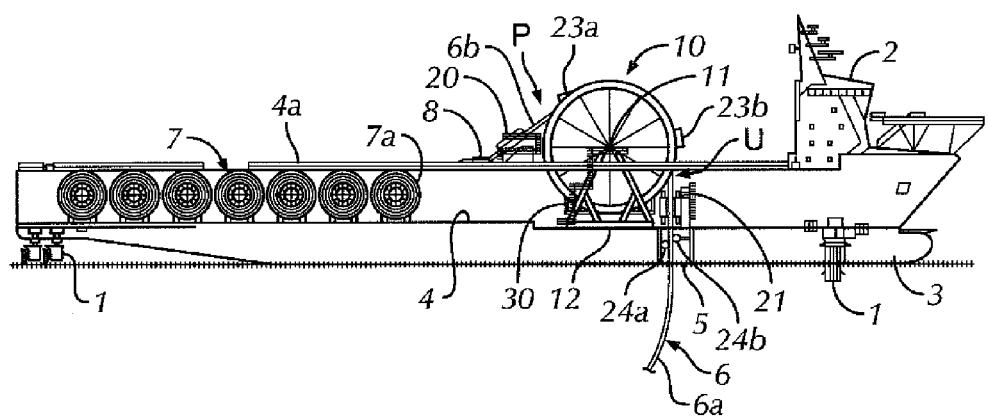
FIGS. 1 and 2 are a side view and a plan view, respectively, of an embodiment of the installation ship according to the invention.
Figure 2:
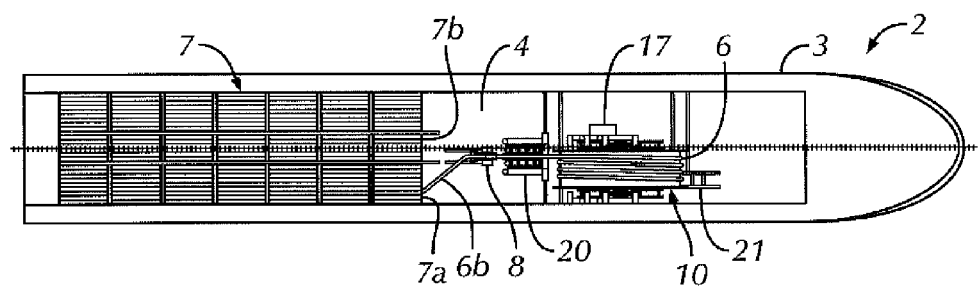

FIGS. 1 and 2 show an installation vessel, or pipe laying ship 2, deploying a flexible pipe 6 into a body of water W. A portion 6a of the flexible pipe is suspended by the laying ship and extends into the water and—as the laying process progresses—onto the seabed below (not shown). Propulsion units (thrusters) 1 control the ship's movement, often controlled by dynamic positioning devices, which are known in the art.

The flexible pipe 6 is fed into the water in a more or less vertical orientation, through a moon-pool 5 in the ship's hull 3. The maximum weight of the suspended flexible pipe 6a may be considerable (depending i.a. on the water depth), e.g. on the order of 300 to 500 metric tonnes.

A cylinder (hereinafter also referred to as a reel) 10 is rotatably supported by a horizontal axle 11 or on the rim of the reel and a support structure 12 which is resting on the ship's lower deck 4. The cylinder diameter may be on the order of 5 to 30 meters, or more. Reference number 30 indicates a guiding unit, which is described below.

The flexible pipe 6 is in the illustrated embodiment stored on a number of spools 7 which are placed on the ship's lower deck 4. In FIGS. 1 and 2, the flexible pipe on a forward starboard spool 7a is fed into a alignment-and-radius-control unit 8, passes through a rear tensioner 20 before it enters the cylinder 10 in a spooling-on region P on the cylinder. The flexible pipe 6 is in the illustrated embodiment wound three turns around the cylinder before it leaves the cylinder at a spooling-off region U and then exits the ship via an optional forward tensioner 21, through the moon pool 5 and into the water. The rear tensioner 20 and the forward tensioner 21 are of a type commonly known in the art. Although the rear tensioner 20 is illustrated in a relatively close proximity to the cylinder 10, it should be understood that the rear tensioner could be placed farther aft on the vessel, closer to the storage spools. It is also conceivable to have more multiple tensioners, one in front of each row of storage spools. The optional forward tensioner 21 is displaceable sideways (i.e. in the cylinder axial direction) in order for it to be aligned with the flexible pipe.

When the forward starboard spool 7a is empty, the pipe laying is halted momentarily while the front end of the flexible pipe on the adjacent forward middle spool 7b is connected to the tail end of the flexible pipe being deployed. Flexible pipe on consecutive spools are accessed and connected in a similar manner. Flexible pipe on the rearward spools is routed to the alignment-and-radius-control unit 8, above the forward spools, e.g. on stanchions or on an upper deck 4a. This ensures a high degree of flexibility and virtually continuous operation.

Figure 11:
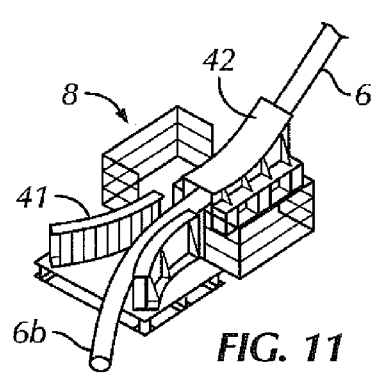
FIGS. 11 and 12 are a perspective view and a plan view, respectively of an embodiment of an alignment-and-radius-control unit for the elongate article.
Figure 12:
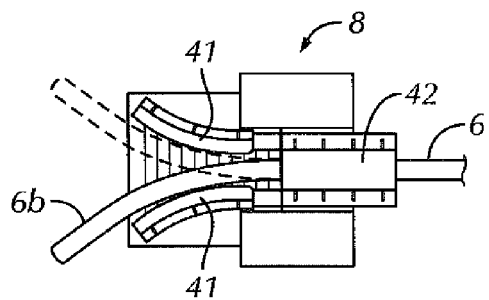

In order to ensure that the flexible pipe is entering the tensioner 20 and cylinder 10 in a straight, in-line fashion, even if the pipe is spooled off of storage spools which are not aligned with the cylinder (e.g. such as spool 7a), the alignment-and-radius-control unit 8 comprises an alignment chute 41 and a radius controller chute 42. These details are illustrated by FIGS. 11 and 12.

FIG. 1 also illustrates optional wheels or caterpillar belts 23a,b which may be biased against the pipe and thus serve as a safety feature in the event of a pipe rupture. Also, a straightener may optionally be included in the spooling-off region; in FIG. 1 illustrated as a wheel 24a on one side of the pipe, and a biased (e.g. spring-loaded, or by hydraulic pressure) wheel

24b on the other side of the pipe. These items are well known in the art, and applicable for rigid pipe, such as coiled tubing.

Figure 3:
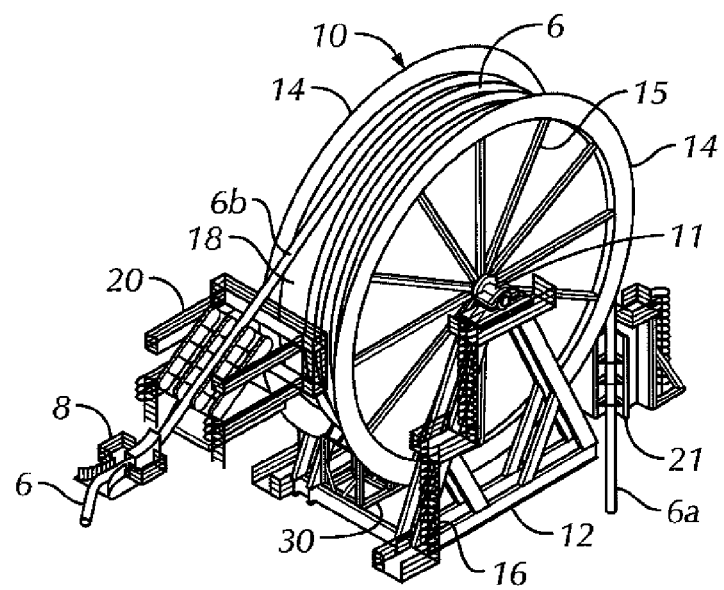
FIGS. 3 and 4 are perspective views of an embodiment of the cylinder according to the invention.
Figure 4:
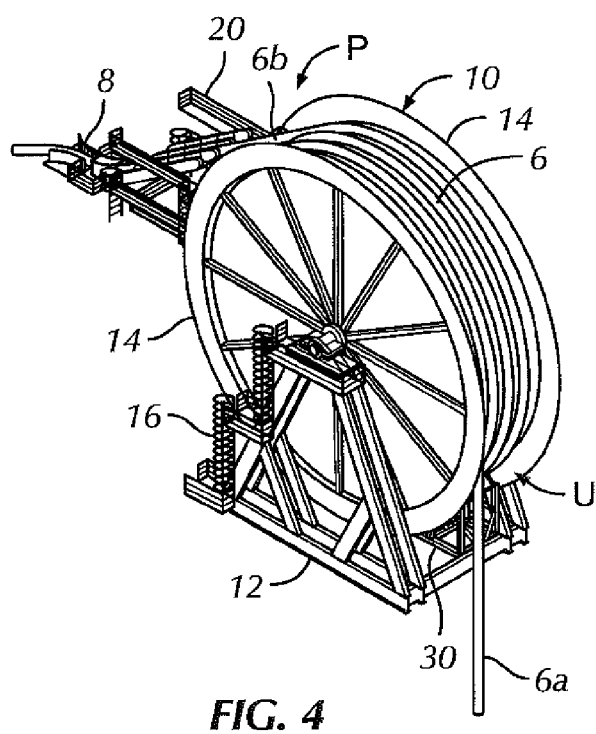
Figure 5:
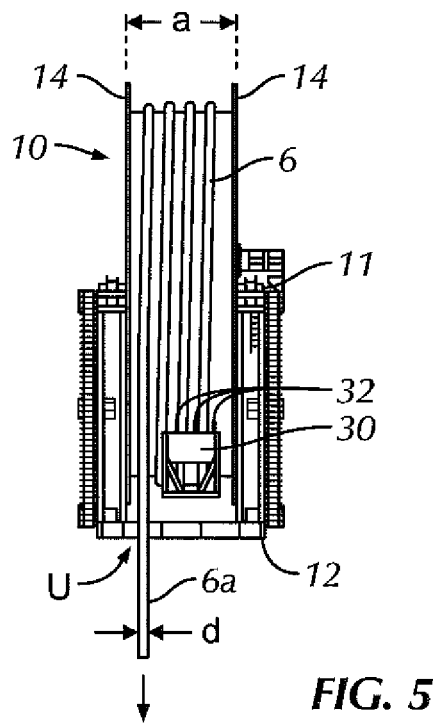
FIG. 5 is a front view of the embodiment of the cylinder illustrated in FIGS. 3 and 4.
Figure 6:
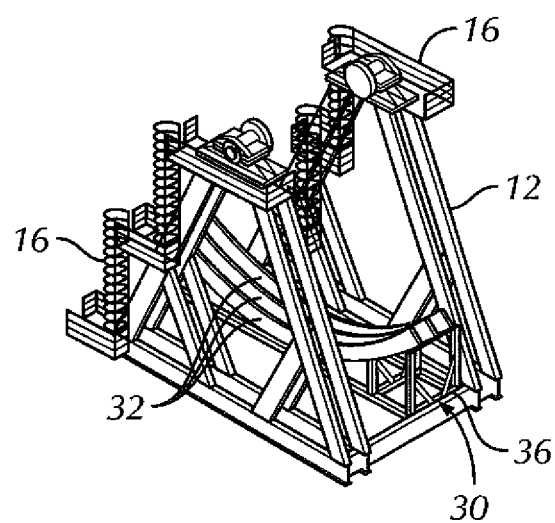
FIG. 6 is a perspective view of an embodiment of the cylinder support structure and the guiding unit according to the invention.
Figure 7:
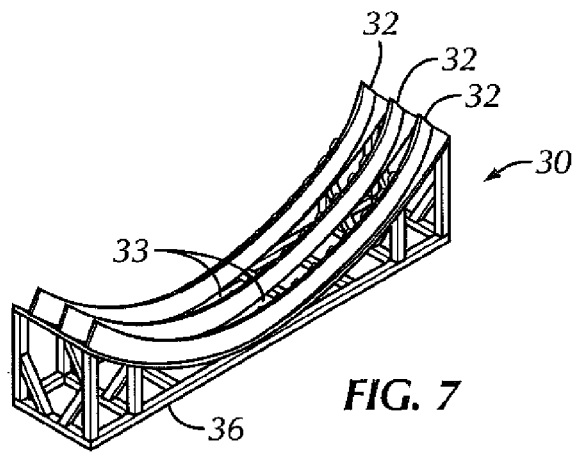
FIG. 7 is a perspective view of the guiding unit according to the invention.
Figure 8:
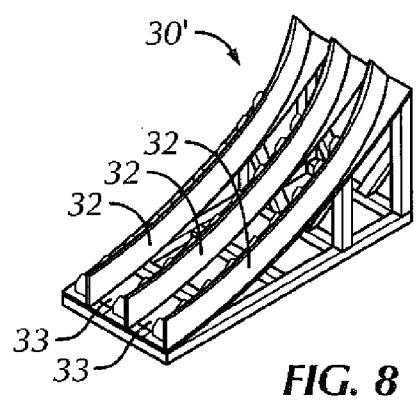
FIGS. 8 and 9 are a perspective view and a plan view, respectively of a portion of the guiding unit illustrated in FIG. 7.
Figure 9:
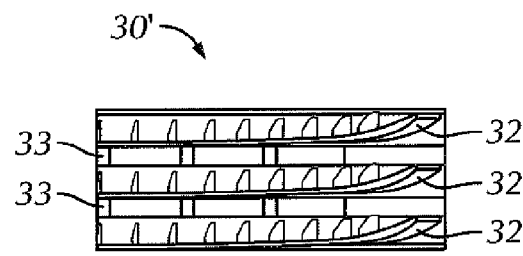

Referring now to FIGS. 3, 4 and 5, the reel 10 comprises a cylindrical body having a cylindrical contacting surface 18, a number of spokes 15, and side walls—or flanges—14. The cylinder is rotatably supported via an axle 11 which in turn is rotatably supported by a structure 12 placed on the ship. The cylinder's rotation is controlled by motors and gears which are commonly known in the art (illustrated schematically as reference number 17 in FIG. 2), and therefore not illustrated or discussed here. (An alternative embodiment (see e.g. FIG. 36, to be discussed later) of the cylinder is a so-called "dolly-based" reel, in which the reel is not supported by a central axle, but via a plurality of rollers along the cylinder rim. The cylinder's rotation would in such case be controlled by a rack-and-pinion type gear.)

Control lines, hydraulic reservoirs and lines, which are required for the operation of the apparatus, as similarly well known and therefore not illustrated and discussed here. Reference number 16 indicates ladders, walkways and access platforms.

The width a in the cylinder's axial direction is greater than the diameter d of the flexible pipe 6 multiplied by the number of complete turns of flexible pipe and allowing for the flexible pipe entering and exiting the cylinder. For example, in the embodiment shown in FIG. 5, the width a is greater than four times the diameter d of the flexible pipe, whereby the entire length of flexible pipe which is on the cylinder is in contact with the contacting surface 18.

The portion 6a of the flexible pipe which extends into the water is thus in this embodiment suspended to a large extent by the cylinder 10, by the friction between the flexible pipe surface and the cylinder's contacting surface 18, which advantageously is covered by a material and/or structures that enhances tangential friction but not axial (sideways) friction. The number of turns (windings) of flexible pipe required is determined by e.g. flexible pipe surface properties, contacting surface properties and laying depth. Thus, the weight of the suspended portion 6a of the flexible pipe is in this embodiment of the cylinder accommodated to a large extent by the cylinder, and there is only a small and manageable load in the rearward portion 6b. Thus, the cylinder 10 removes the requirement for the tensioner towers of the prior art.

The pipe-laying process (i.e. paying-out of the flexible pipe) may in this embodiment be controlled mainly by the rotation of the cylinder, by a controlled operation of the aforementioned cylinder motors (17). The rear tensioner 20 ensures that there is a pre-tension in the rearward portion 6b of the flexible pipe, in order to ensure adherence between flexible pipe and the contacting surface.

The spooling process may be performed by initially connecting a pilot line (e.g. a wire, not shown) to the free end of a flexible pipe on one of the storage spools (e.g. forward spool 7a), then extending the pilot line free end through the alignment-and-radius-control unit 8 and the rear tensioner 20, and entering the reel's cylindrical body in the spooling-on region P. The pilot line is then wound a required number of turns around the cylinder contacting surface before leaving the cylinder in the spooling-off region U and—optionally, as described above—the free end may be fed through the forward tensioner 21. Then, the pilot line is operated to pull the flexible pipe through the same route, i.e. around the cylinder and through the forward tensioner 21. The optional forward tensioner 21 may be useful in this initial stage of the laying process in applying a pre-tension in the part of the flexible pipe coming off the cylinder until that part (i.e. the suspended part 6a) is sufficiently long (and heavy) to provide sufficient tension onto the cylinder. A similar pre-tension may, however, in this initial stage be provided by a clump weight (not shown) attached to the flexible pipe free end.

In order to control that portion of the flexible pipe 6 which at any given moment is on the cylinder 10, the invention provides a guiding unit 30 which in the illustrated embodiment is arranged on the cylinder support structure 12, underneath the cylinder 10 (see FIGS. 2-5). This guiding unit will now be described in more detail, particularly with reference to FIGS. 6-10.

Figure 15:
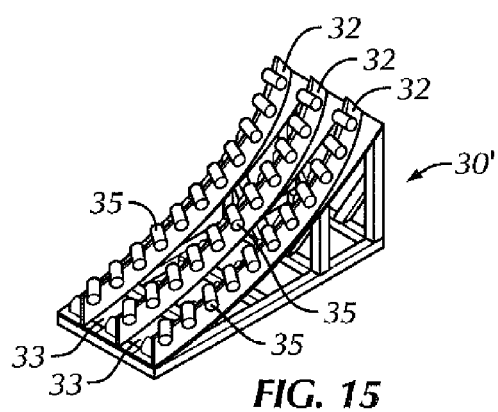
FIG. 15 is a perspective view of yet another embodiment of the guiding unit.
Figure 16:
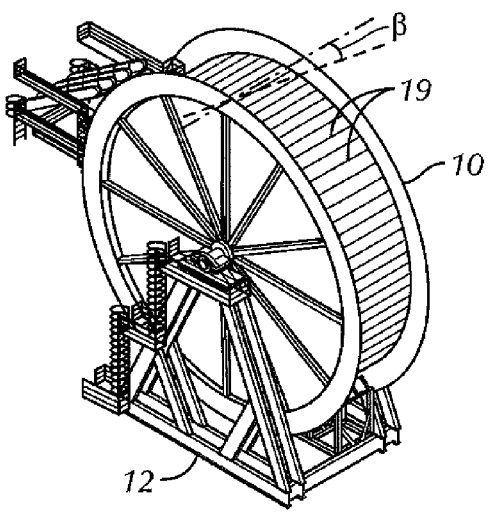
FIG. 16 is a perspective view of the cylinder according to the invention, illustrating traction-enhancing ridges arranged on the contacting surface.
Figure 17:
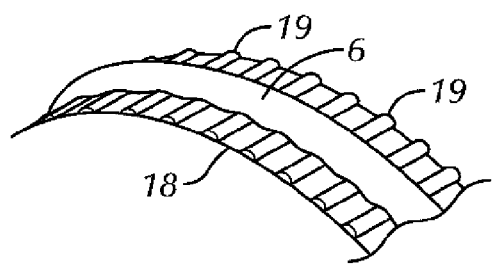
FIG. 17 is a sketch of a part of the contacting surface, having a number of ridges.

The guiding unit 30 comprises in the illustrated embodiment a number of guiding vanes 32 connected to a frame 36 which is connected to the support structure (and thus the hull of the ship. The vanes 32 extend towards and to within a distance from the cylinder contacting surface 18, and are have a curvature similar to that of the cylinder 10. Adjacent vanes 32 define between them a channel 33 and the vanes are arranged with a distance between them such that each channel is sufficiently wide for accommodating one flexible pipe diameter d (see FIG. 5) and also a wider end termination (not shown). The guiding vanes' surfaces thus come into contact with a portion of the flexible pipe and work to force that portion sideways on the cylinder. The guiding vane's surface is preferably of a material having low friction, such as polished steel, xzylan coating, polyurethane coating, or similar materials or coatings. Optionally, in an alternative embodiment illustrated by FIG. 15, the guiding vanes' surfaces comprise rollers 35, whereby the friction is further reduced.

Figure 10:
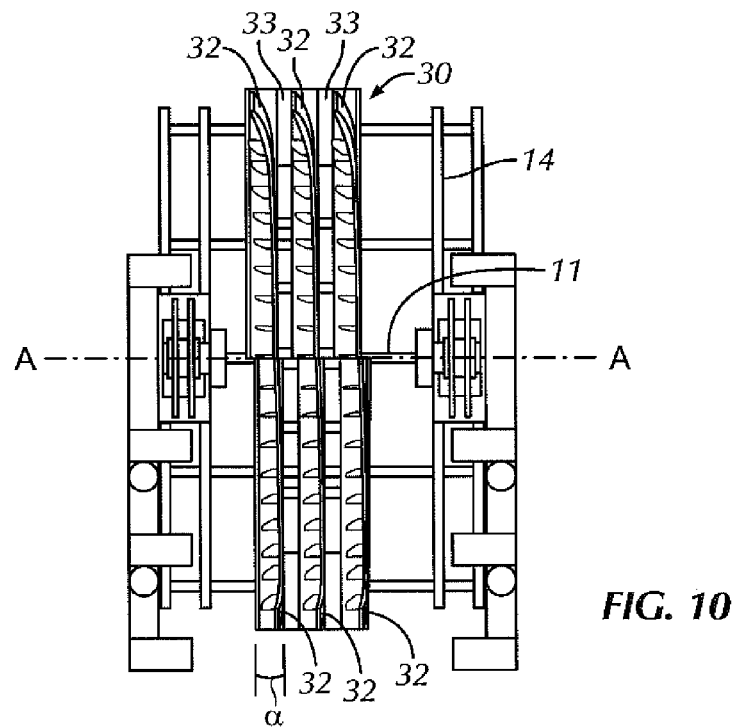
FIG. 10 is a plan view of an embodiment of the cylinder support structure and the guiding unit according to the invention.

The vanes 32 are arranged parallel with respect to each other, but non-parallel with respect to the cylinder's rotational plane (i.e. a plane which is perpendicular to the cylinder's axis of rotation A-A (see FIG. 10). The set of vanes 32 thus exhibit a pitch angle (or, "thread angle") $\alpha$ ($>0°$) with respect to the cylinder 10, ensuring that the portion of the flexible pipe which at any given moment is on the cylinder is moved sideways (i.e. in the cylinder's axial direction) in a controlled fashion. The vanes may also have a tilt angle with respect to the vertical axis (not shown) in order to compensate for the moments imposed on the pipe. The guiding unit ensures that the flexible pipe (and its end terminations and joints) is moved sideways on the cylinder 10 for each revolution of the cylinder.

In a practical application, the guiding unit 30 comprises two similar modules 30' (see FIGS. 8 and 9), allowing to guiding unit to be assembled and disassembled underneath an already installed cylinder 10.

Figure 13:
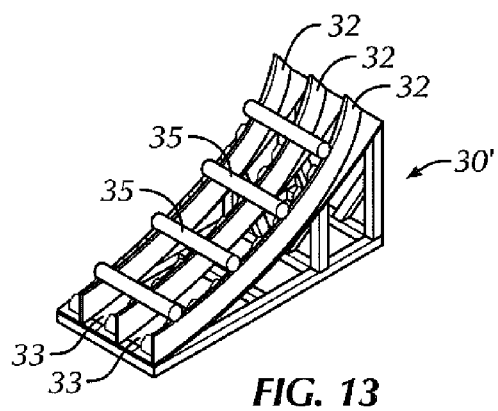
FIGS. 13 and 14 are a perspective view and a plan view, respectively of an alternative embodiment of the guiding unit.
Figure 14:
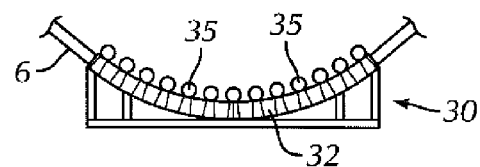

FIGS. 13 and 14 illustrate another embodiment of the guiding unit, where a plurality of rollers 35 is arranged between adjacent vanes, spanning the channels 33. The flexible pipe 6 is thus forced into the channel 33 and effectively being pulled away from the contacting surface in that region covered by the guiding unit. The flexible pipe is thus lifted off from the contacting surface when it is being shifted sideways, and is subjected to very little friction in that operation.

Referring now to FIGS. 16-19, the cylinder's traction properties may be enhanced by the addition of a plurality of ridges 19 on the contacting surface 18. The ridges are arranged at regular intervals on the contacting surface, creating an array of successive ridges and valleys, and may comprise any suitable material to provide a temporary deformation in the outer mantle of the flexible pipe; this is indicated schematically in FIG. 17. The ridges 19 are shaped so as to only provide a temporary elastic deformation in the outer mantle, and not damage this outer mantle or any other parts of the pipe.

Figure 18:
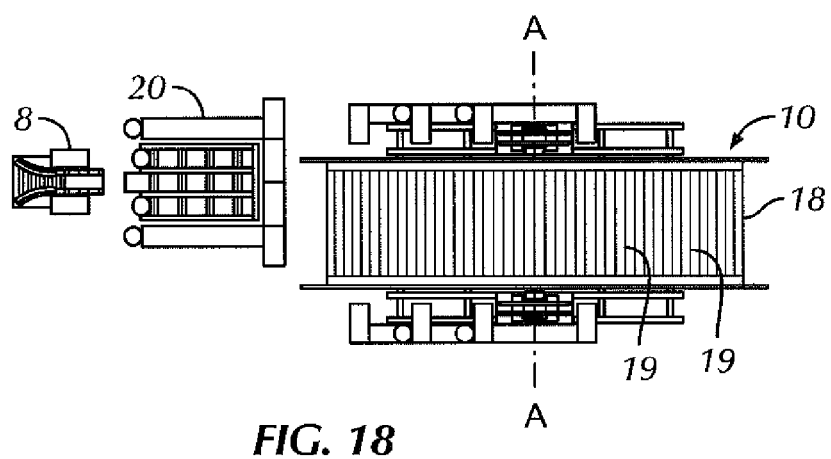
FIGS. 18 and 19 are principle sketches indicating respective orientations of the ridges on the cylinder.
Figure 19:
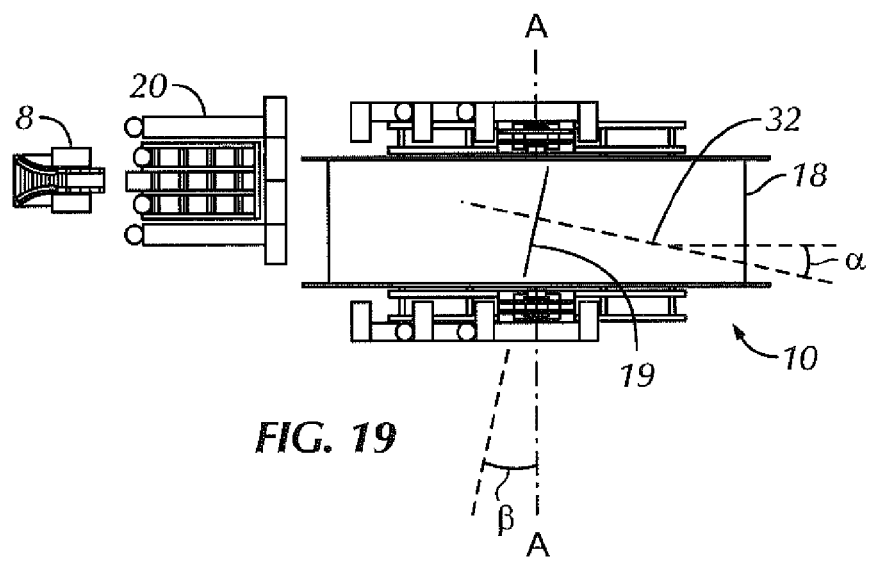

In one configuration, the ridges 19 are arranged parallel with the cylinder axis A-A, as shown in FIG. 18. Referring to FIG. 19, the ridges 19 may also be arranged with a skewed angle β with respect to the cylinder axis. In this latter configuration, the skew angle β is preferably such that each ridge 19 is oriented perpendicularly with the guiding vane 32, in order not to increase radial friction as the tangential friction is increased. FIG. 19 illustrates this principle, and thus only shows one ridge 19 and one guiding vane 32 (dotted line). The angles (α and β) are also exaggerated in FIG. 19 in order to illustrate the principle; in a practical application, these angles are quite shallow.

The ridges are attached so that they are easily removable, e.g. by means of bolts or similar fasteners.

Another embodiment of the apparatus according to the invention will now be described with reference to FIGS. 20 to 31c.

Figure 20:
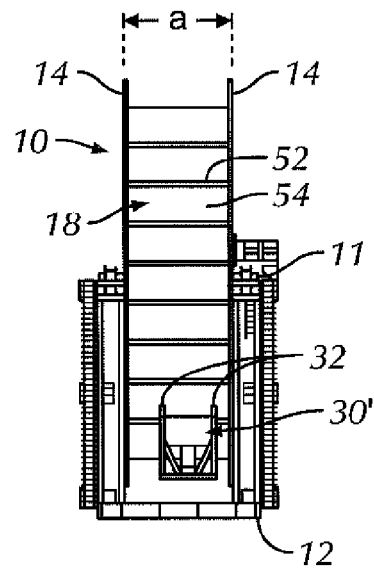
FIG. 20 is a front view of the cylinder, illustrating another embodiment for guiding of the elongate article.
Figure 21:
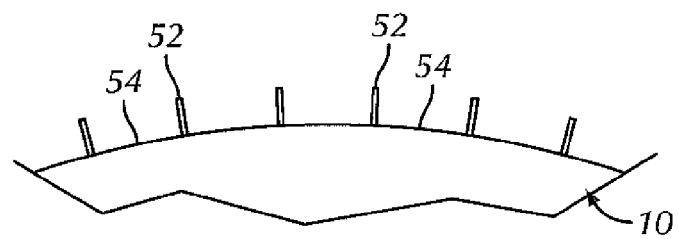
FIG. 21 is a schematic side view of a portion of the cylinder which is illustrated in FIG. 20, illustrating cradle receptacles.
Figure 22:
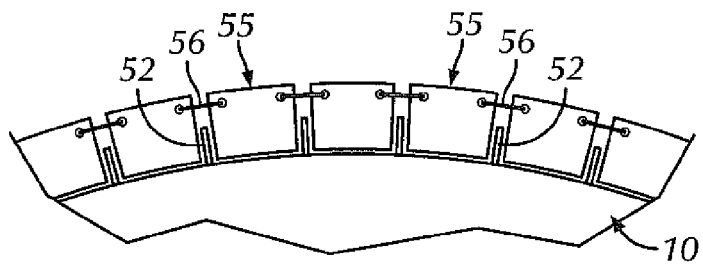
FIG. 22 is a figure similar to FIG. 21, with cradles installed.

As shown in FIGS. 20 and 21, the contacting surface 18 comprises a number of walls or partitions 52, extending radially and axially between the end flanges 14. The partitions 52 thus define compartments 54 which serve as receptacles for individual cradles 55. The cradles 55 are configured for supporting a respective portion of the flexible pipe (discussed below). FIG. 22 is a schematic representation of how cradles 55 are arranged in respective receptacles and being interconnected via connection elements 56. Each cradle is configured such that it abuts against the partitions 52.

Figure 23:
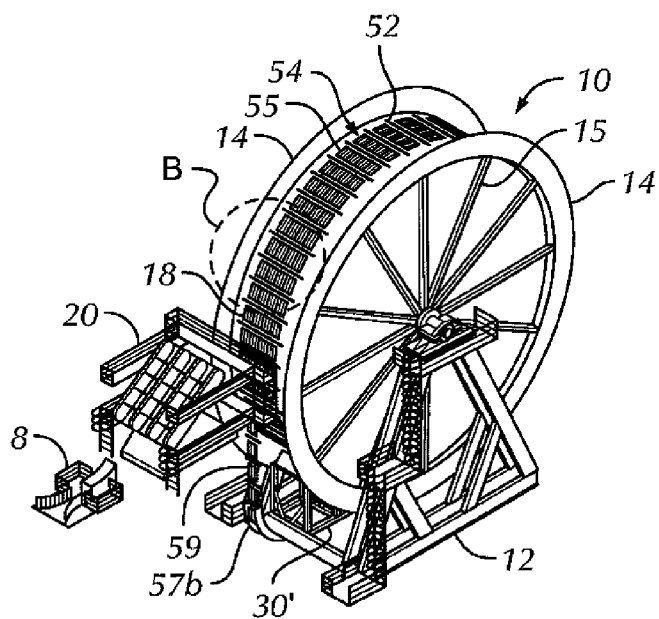
FIG. 23 is a perspective view of the embodiment illustrated in FIGS. 20 and 21, with the cradles installed.
Figure 24:
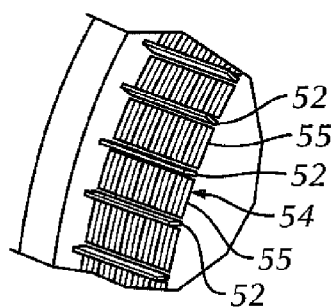
FIG. 24 is an enlarged view of portion "B" in FIG. 23.

FIG. 23 illustrates how a plurality of cradles 55 are linked together via the aforementioned (preferably flexible) connection elements 56 to form an endless belt which is wrapped a number of turns around the cylinder. Thus, in the figure, four cradles 55 are placed next to one another (side-by-side in the axial direction) within each receptacle 54 for the majority of the cylinder circumference. Within each receptacle, the cradles are abutting against each other in the axial direction, and are abutting against the partitions 52. Thus, the partitions prevent the cradles from moving in the tangential direction. In the cylinder lower portion, where the belt is lifted off the cylinder in order to be shifted (in the axial direction), each receptacle 54 comprises three cradles, side-by-side.

Figure 25:
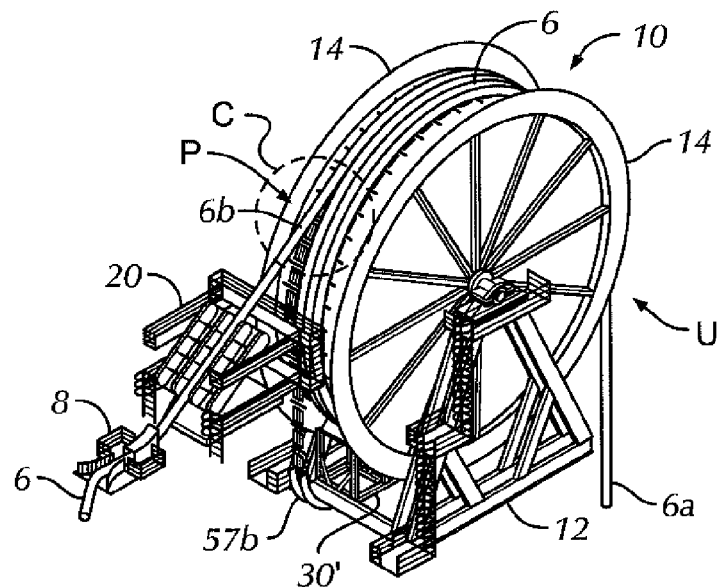
FIG. 25 is a view similar to that of FIG. 23, but also showing the elongate article on the cylinder.
Figure 26:
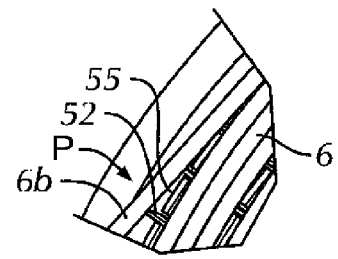
FIG. 26 is an enlarged view of portion "C" in FIG. 25.

FIGS. 25 and 26 show how the flexible pipe 6 is arranged around the cylinder 10 and supported by the cradles 55. The part of the flexible pipe 6 which is supported by the cylinder is thus supported statically by the cradles. Sideways (i.e. in the axial direction) friction is accommodated by the cradles and the flexible pipe is not twisted as it is moved in the axial direction on the cylinder.

Figure 30A:
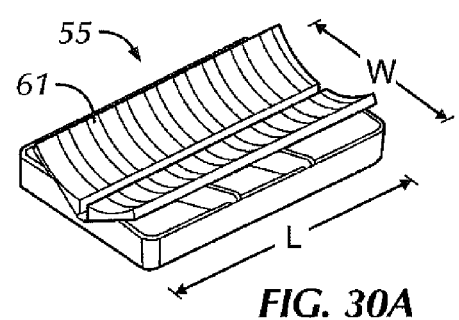
FIGS. 30a-30d are perspective views of cradles of various shapes.
Figure 30B:
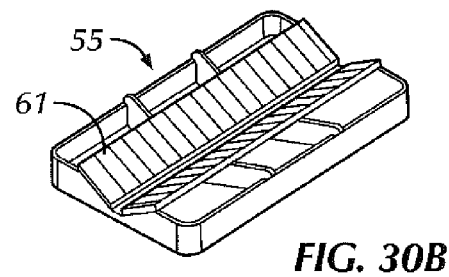
Figure 30C:
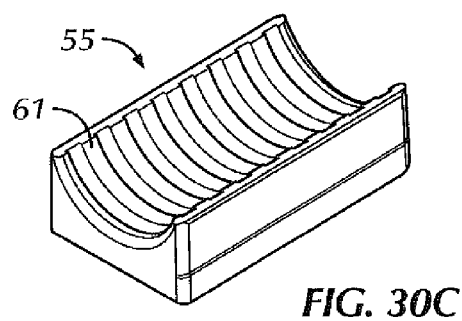
Figure 30D:
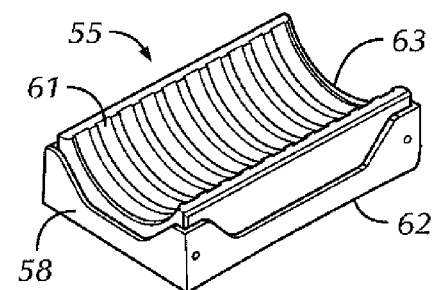

FIGS. 30a-30d show how the cradles' pipe-supporting region may be shaped to suit the diameter and exterior surface of the applicable flexible pipe. The pipe-supporting region preferably comprises corrugations 61 in order to improve traction (friction) between the cradle and the flexible pipe. The exterior dimensions of the cradle illustrated by FIG. 30a, is on the order of 1=100 cm, w=60 cm. The invention is, however, not limited to such dimensions. In the embodiment shown in FIG. 30d, the cradle comprises an insert portion 63 and a socket 62. The part of the cradle which is supported by the cylinder surface (underside of insert, cradle and/or socket) preferably comprise a low-friction material.

Figure 27:
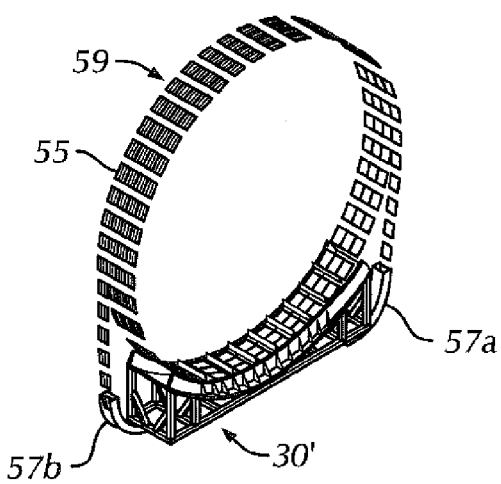
FIG. 27 is a perspective view of an endless belt of cradles and corresponding guiding structures, in a configuration comparable with the one shown in FIG. 23, but not showing the cylinder and ancillary equipment.
Figure 28:
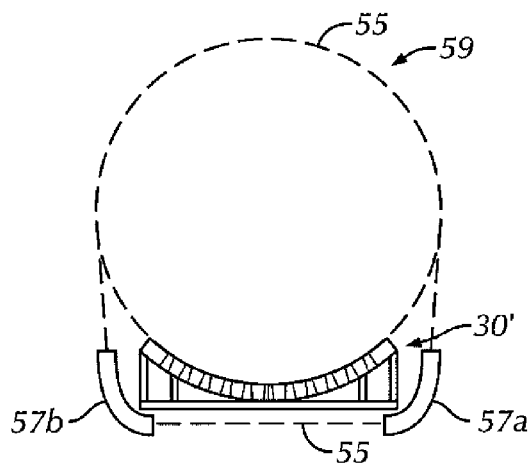
FIG. 28 is a side view of the embodiment illustrated in FIG. 27.

FIGS. 27 and 28 show how the endless belt 59 of cradles 55 is wrapped a number of times around the cylinder (not shown in FIG. 27). In the lower region, the belt 59 is lifted off of the cylinder and passed through a first guide funnel 57a, then conveyed diagonally underneath the guiding unit 30' and into a second guide funnel 57b before it re-enters the cylinder on the opposite side from where it was lifted off. The guide funnels 57a,b are attached to the guiding unit 30' (see also FIGS. 23 and 25).

Figure 29:
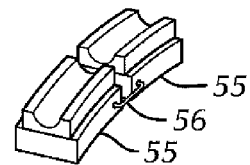
FIG. 29 is a perspective view of two interconnected cradles.

FIG. 29 shows how cradles 55 are interconnected by connection elements 55 which preferably are flexible (straps, or similar). The purpose of the connection elements is to link the series of cradles together and maintain an endless belt also when the belt is lifted off from the cylinder (as described above with reference to FIGS. 27 and 28). When the cradles are in place in the receptacles and provides support for the flexible pipe, there is no tension in these connection elements.

Figure 31A:
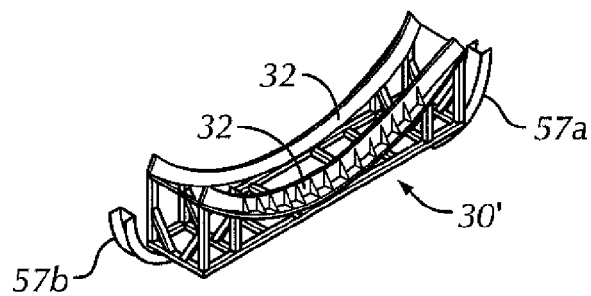
FIGS. 31a-31c are perspective view, side view and top view, respectively, of the guiding structures.
Figure 31B:
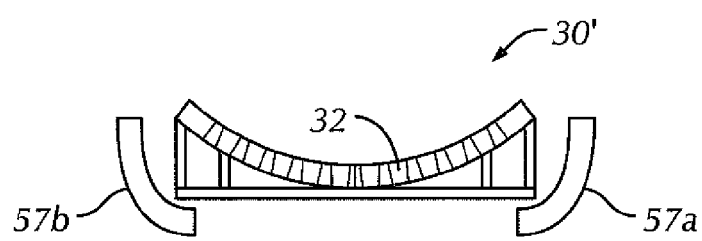
Figure 31C:
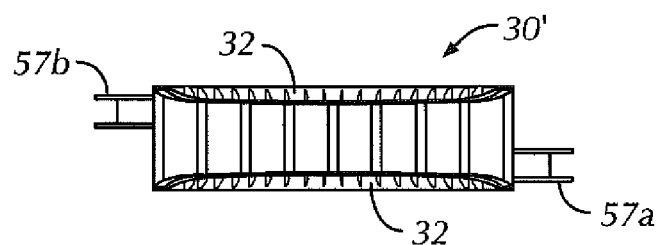
Figure 32:
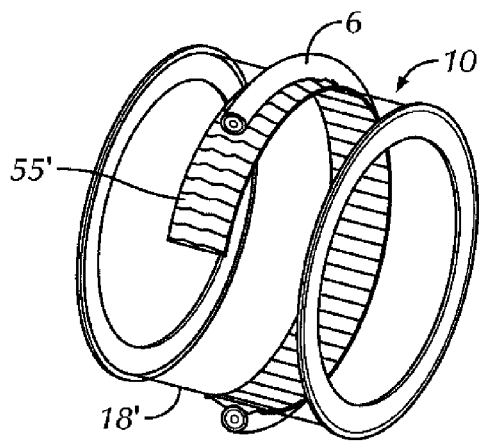
FIG. 32 is a perspective view of another embodiment of the cradle on a reel.
Figure 33:
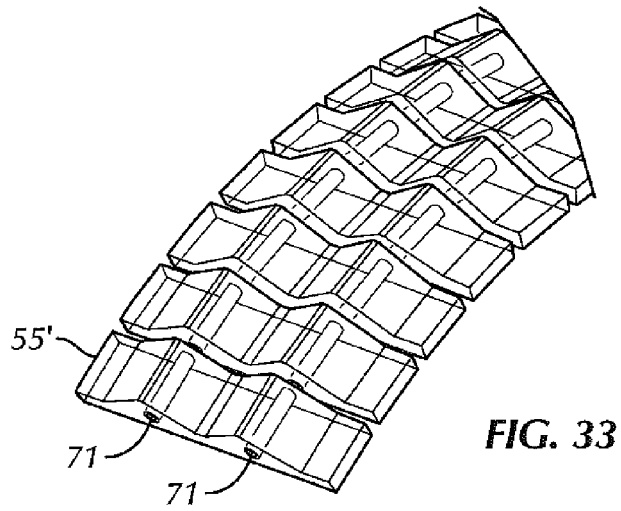
FIG. 33 is a close-up view of the cradle illustrated in FIG. 32.

FIGS. 31a-31c show how the guiding unit 30' comprises two guiding vanes 30, one on each side of the belt's path.

Although an endless belt 59 of cradles 55, as described above, is preferable form an operational point of view, it should be understood that the cradles may instead be placed manually into the receptacles as the cylinder is turning, for example in the spooling-on region P, thus providing the same support to the flexible pipe as described above. In this case, when the cradles reach the spooling-off region U, they will fall out of the receptacle and may be collected for re-use.

A further embodiment of the apparatus according to the invention will now be described with reference to FIGS. 32-35c.

In this embodiment, the contacting surface 18' is smooth, and does not have partitions as described above. A series of individual cradles 55' are configured for supporting a respective portion of the flexible pipe 6 and are interconnected via elastic wire 71, or similar, thus forming an endless belt which is wrapped a number of turns around the cylinder, similar to the endless belt configuration described above.

A riser is typically built up of concentric sections, with layers of low friction in between. It is important that the outer shell/layer is not pulled off or moved relatively to the load-carrying layers underneath. As the tension in the riser increases during the travel on the reel towards the outlet, the elongation increases. Hence, it is advantageous for the riser or its support to be able to slide against the reel contacting surface in order to avoid internal slippage in the riser.

Figure 34:
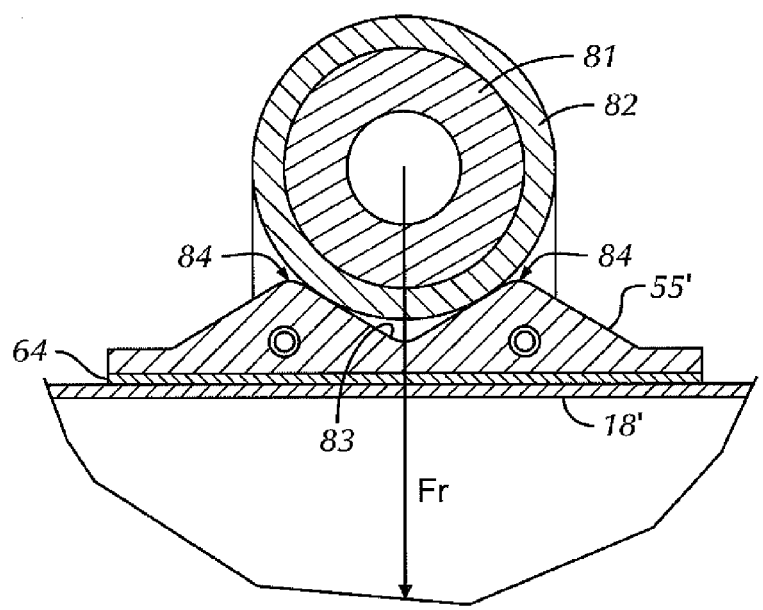
FIG. 34 is a diagrammatic sectional view illustrating various layers within a riser, and the riser in a cradle.

Referring to FIG. 34, friction between an inner riser section 81 and an outer riser section 82 may be extremely low. On the other hand, it is difficult to reduce the friction between the underside of the cradle and the reel surface, because of their exposure to contaminants, such as sand, etc. Each cradle 55' does therefore advantageously comprise a "V" shaped profile, i.e. having a valley 83 in between two ridges 84, which increases the friction force compared to a surface which is oriented normal to the radial load, $F_r$.

It is essential that the total friction force between cradle and reel surface 18' is lower than the internal friction in the riser, including the extra force due to the V-shape. The friction between the cradle 55' and the contacting surface 18' (reel drum) can also be made extremely low, but does not need to be as low as the internals of the riser due to the V-shape.

The internal friction coefficient between the riser sections 81, 82 are dependent on the contact pressure. Typically, an increase of pressure reduces the friction coefficient. It is a design principle that the friction coefficient between the material 64 on the underside of the cradle 55' and the contacting surface 18' of the reel has equivalent dependence, hence following the requirement of always being below internal friction without going unnecessary low. This ensures that the cradles slide on the contacting surface 18' and that the riser sections 81, 82 do not slide with respect to one another.

Figure 35B:
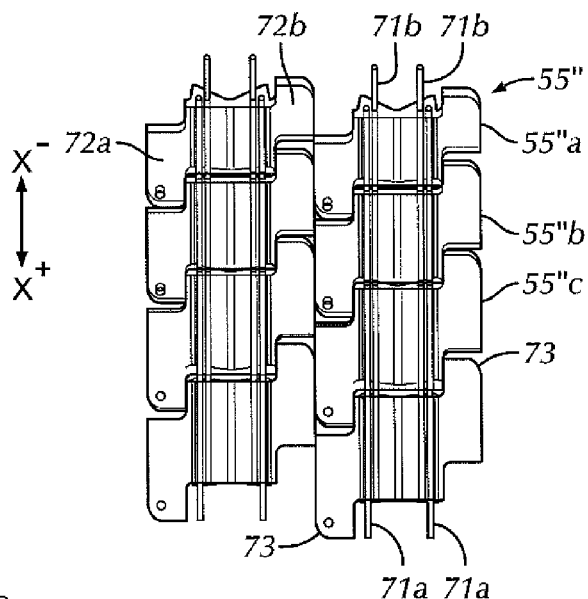
Figure 35A:
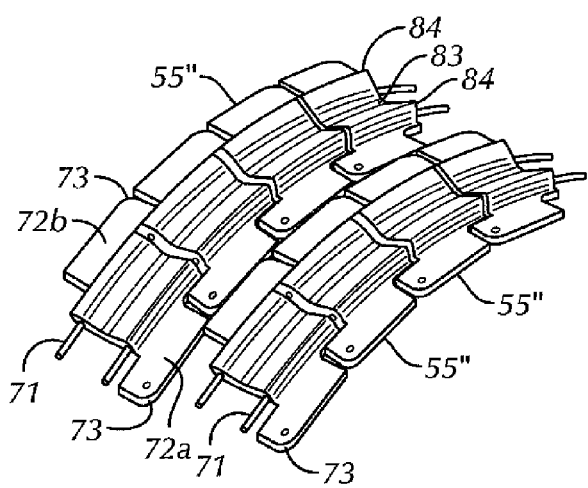
FIG. 35a, b, c are perspective, bottom and front view, respectively, of an embodiment of the cradle, where
Figure 35C:
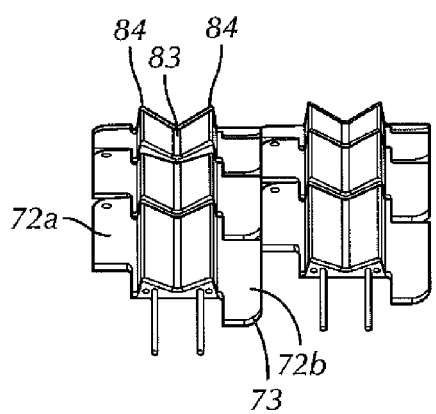

FIGS. 35a-c show an embodiment of a cradle 55" having side panels 72a,b that are offset with respect to one another, such that the one side panel 72a extends the farthest in the one ($x^+$) longitudinal direction and the other side panel 72b extends the farthest in the opposite ($x^-$) direction. This skew-shaped cradle allows for non-twisting guiding by the vane 32, channel and rollers described above. The vanes 32 (see e.g. FIGS. 7-9) tend to push the cradle over in an axial direction on the reel, but also introduces friction against the side of the cradles, hence tending to give them a twist. Such tendency to twisting is reduced by the skew shape, setting up an opposite torque. The shape also stabilizes the movement of the cradles 55" as they link together. The foremost corner 73 may be rounded or equipped with a roller (not shown). Rollers may also be applied on the side of the cradles.

Figure 35D:
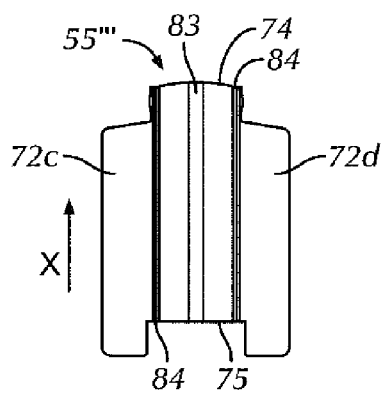
FIG. 35d is a top view of yet an embodiment of the cradle.
Figure 35E:
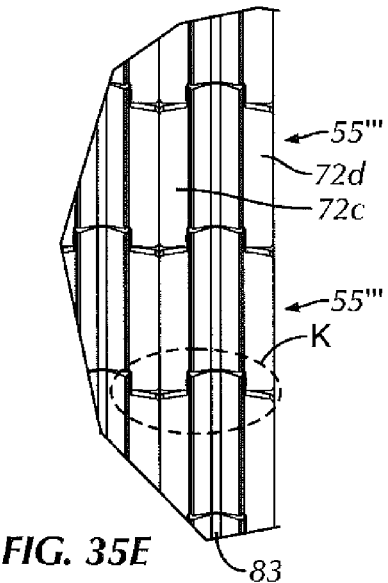
FIG. 35e is an enlargement of the section marked "E" in FIG. 38.
Figure 35F:
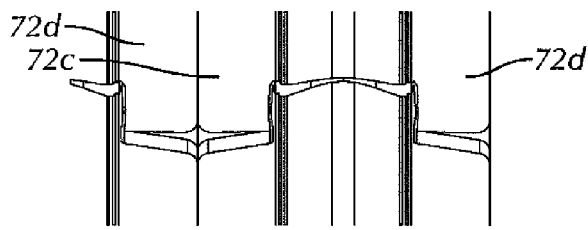
FIG. 35f is an enlargement of the section marked "K" in FIG. 35e.
Figure 35G:
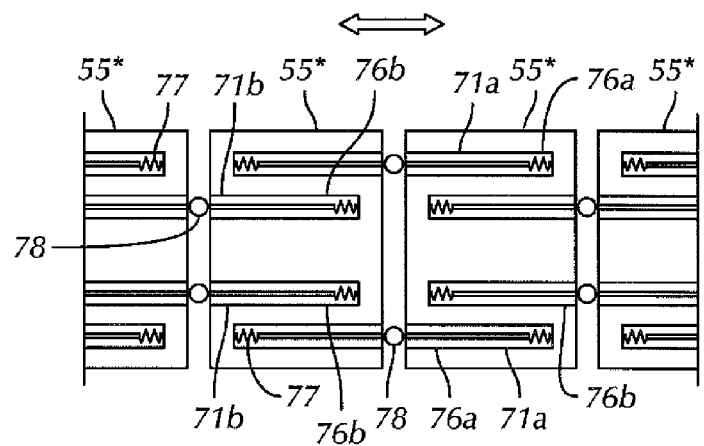
FIG. 35g is a schematic sketch of a connection configuration for a belt of cradles.

FIG. 35d shows a further embodiment of a cradle 55''' having wide panels 72c,d that are symmetric in the longitudinal (x) direction. An advantage with this configuration is seen when a plurality of cradles 55''' are connected as shown in FIG. 35e (which is an enlargement of the area "E" in FIG. 38). For the cradles 55''' that are connected in an end-to-end relationship, the protruding end 74 is accommodated by the recessed end 75 of the adjacent cradle, in a plug-and-socket configuration. This provides a stable connection for the cradles that are connected in this fashion in an end-to-end relationship, and also transversely (sideways on the reel), between adjacent belts of cradles.

The connecting wires/ropes 71 between the cradles must be elastic (or have an elastic connection) in order to allow the cradles to follow the elongation of the riser. The elastic ropes are preferably connected at opposite ends of the cradles in order to have maximum length and flexibility. The next pair of cradles is connected with another pair of elastic ropes 71 located next to the previous connection, as a drive chain. This is illustrated in FIG. 35b, where a first pair of ropes 71a connect cradles 55"a and 55"b, while a second pair of elastic ropes 71b connect cradles 55"b and 55"c. This connection principle is preferably used on all of the cradle embodiments 55', 55", 55'''. The principle is illustrated in the sketch in FIG. 35g, where reference number 55\* denotes a cradle in general. Each cradle has a first pair of internal bores 76a and a second pair of internal bores 76b. Each of the bores has an open end and a closed end. A spring 77 is connected to the cradle body at this closed end. The cradles are arranged in an end-to-end relationship such that open ends of adjacent cradles face each other, and a wire 71a,b is connected between opposite springs 77 (see FIG. 35g). The flexibility of the belt of cradles is thus determined by the stiffness of the springs and the elasticity of the wires. Optionally, resilient pads 78 may be disposed between the cradles in order to absorb impact loads between the cradles.

Figure 36:
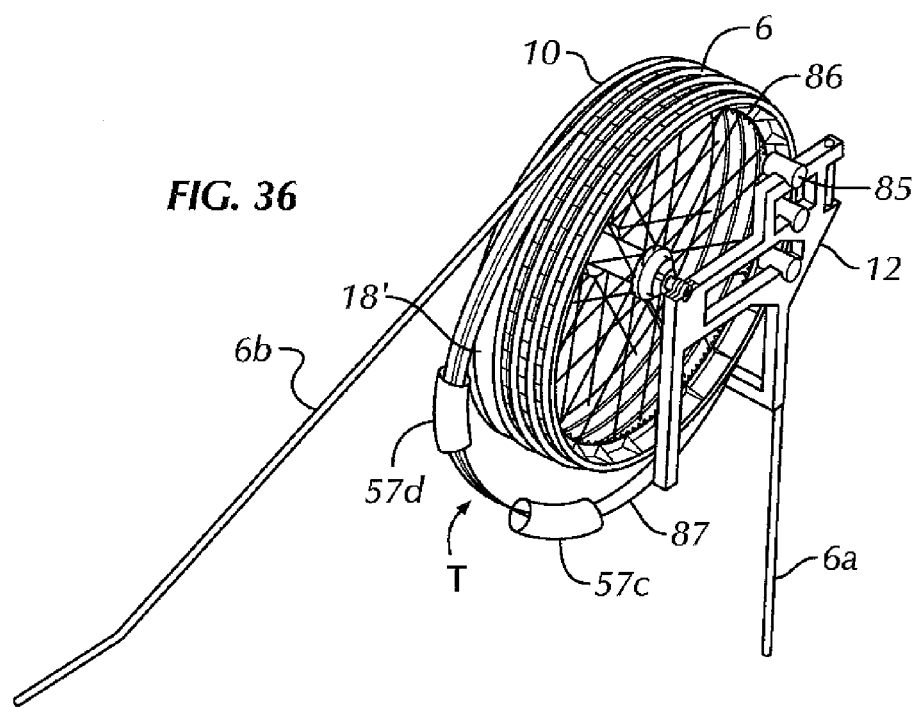
FIG. 36 is a perspective view of the cylindrical body, or reel, supporting the pipe via an embodiment of the belt of cradles.

FIG. 36 illustrates the reel 10 supported by a structure 12. Motors 85 are via cog wheels (not shown) connected to toothed rim 86 on the reel 10, whereby the reel's rotation may be controlled. The pipe 6 is coiled a plurality of turns around the reel, but is supported by a belt 87 of cradles 55'; 55"; 55''' as described above, supported by a smooth surface 18'. FIG. 36 also shows the rearward pipe portion 6b, and the forwards portion 6a which is supported by the reel (or cylinder) as described above.

The belt's "take-off region", i.e. where the belt of cradles is lifted off the reel at one axial end and shifted over to the reel's other axial end, is identified as "T" in the figures. In the take-off region T, the belt is guided by structures 57c,d (only indicated, in dotted lines), e.g. similar to the guide funnels 57a,b described above. These guide structures are not shown in FIGS. 37-42.

Figure 37:
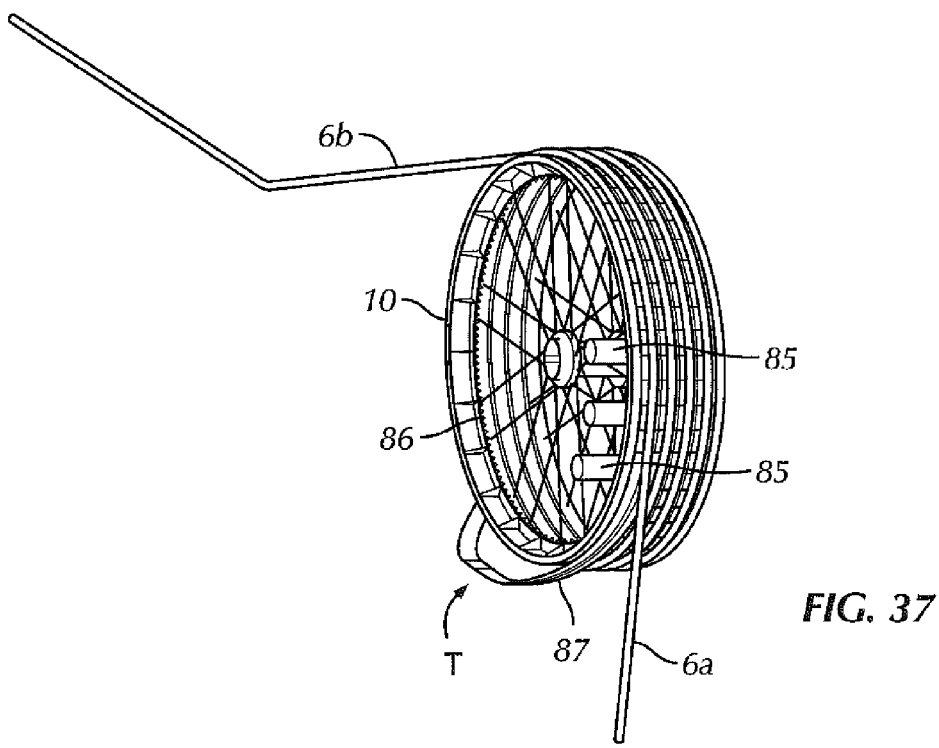
FIG. 37 is a perspective view of the same embodiment as in FIG. 36.

FIG. 37 is a view of the same embodiment as in FIG. 36, but from a different perspective, and the support structure has been removed.

FIG. 38 is similar to FIG. 37, and FIG. 39 is similar to FIG. 36, but in FIGS. 38 and 39 the pipe and the reel have been removed in order to illustrate an internal guide mechanism. Two belt guides 90a,b are arranged on opposite sides of the belts, comprise roller wheels 88a,b and bear against the rim 114 on the reel structure. The belt guides (which are wedge-shaped) and the roller wheels 88a,b serve to push the belt of guides in an axial direction, towards the rim on the other side. FIG. 40 shows this embodiment in a top view.

FIGS. 41 and 42 illustrate how the belt guides 90a,b have low profiles, enabling large objects, such as a pipe joint termination 93, to pass by.

Figure 43:
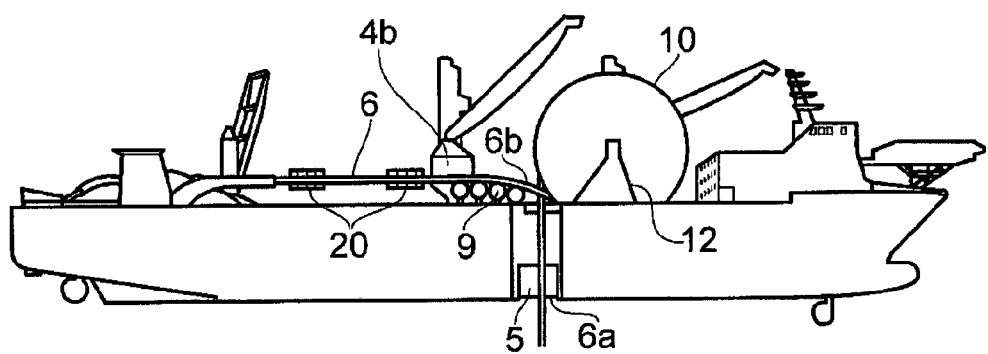
FIGS. 43 and 44 are side and top views, respectively, of an installation vessel carrying another embodiment of the invention.
Figure 44:
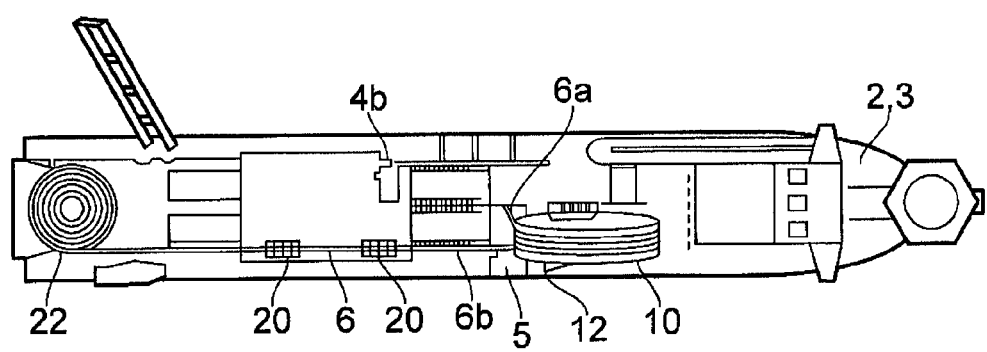
Figure 45:
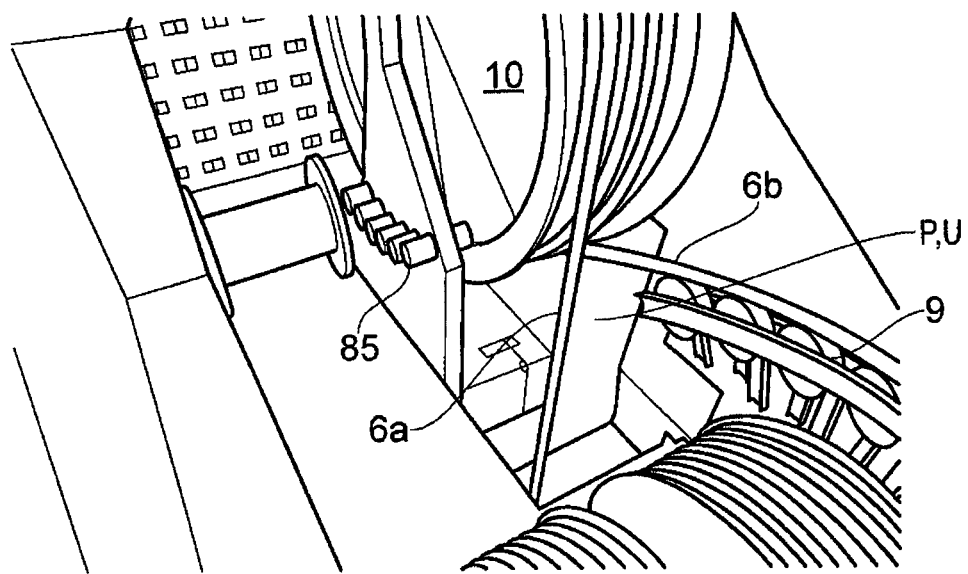
FIG. 45 is a perspective view of the spooling-on/spooling-off regions associated with the embodiment of the invention shown in FIGS. 43 and 44.

Referring now to FIGS. 43-45, an alternative spooling-on configuration is illustrated. In this embodiment, the reel 10 has been placed in front of the moon-pool 5, such that the pipe 6 is spooled onto the reel (P) on the same side as it is spooled off (U). This set-up is convenient from an operational point of view, in that an operator—located in an operator's cabin 4b—has visual control with the pipe both as it is entering the reel and as it is leaving it, as well as the feeding through the horizontal tensioner 20. In the illustrated embodiment, the pipe is stored on a horizontal storage drum 22 and conveyed to the reel 10 via tensioners 20.

Figure 46:
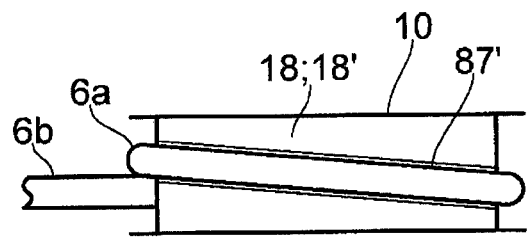
FIG. 46 is a schematic top view of a configuration of the embodiment illustrated in FIGS. 43-45.
Figure 47:
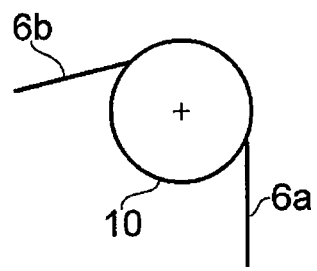
FIG. 47 is a schematic side view of yet a configuration.

FIG. 46 shows a configuration where the pipe is wound only once around the reel. FIG. 47 shows a configuration where the pipe only passes over the reel, and is not wrapped around the reel as described above. While these uses of the invented device to a greater extent than the multiple-wrap configuration relies on the rearward tensioners 20, it has the advantage of having the endless belt 87' wrapped around the reel only once, thus obviating the need for the devices for taking off and shifting the belt, as described above.

While the invention has been described with reference to a flexible pipe, it should be understood that the invention is equally applicable for use in handling other flexible articles, such as mooring rope, wire and chains, cables, and rigid pipes.

Although the invention has been described in the context of deploying an elongate article into the water, and the terms "spooling-on region" and "spooling-off region" are used in the description, the skilled person will understand that the invention is equally applicable for the operation of retrieving an elongate article, i.e. reversing the rotation of the cylindrical element.

While the description refers to the flexible pipe being fed into the water through a moon-pool 5, the inventions shall be equally applicable for vessel configurations where the pipe is fed into the water over the side on the vessel, or it stern.

The invention claimed is:

1. An apparatus for feeding an elongate article from a floating vessel and suspending a first portion of the elongate article in a body of water below the floating vessel, the apparatus comprising:
    a cylindrical body rotatably supported on the floating vessel, the cylindrical body comprising:
        driving means for controlling a rotation of the cylindrical body;
        a spooling-on region and a spooling-off region for the elongate article; and
        a cylindrical contacting surface for interaction with at least a portion of the elongate article either directly or via a plurality of support elements, wherein the cylindrical contacting surface is configured to support the first portion;
    a first tensioner means for the elongate article, the first tensioner means arranged on the floating vessel between the spooling-on region and a storage area for the elongate article; and
    a guiding apparatus arranged on the vessel proximate to the cylindrical contacting surface,
    wherein the guiding apparatus is arranged and configured to control movement of the portion of the elongate article interacting with the cylindrical contacting surface between the spooling-on region and the spooling-off region, and wherein the guiding apparatus comprises a plurality of individual guiding means, each of the plurality of individual guiding means being configured to control a movement of one of a plurality of turns of the elongate article around the cylindrical contacting surface.

2. The apparatus of claim 1, further comprising:
a second tensioner means for the elongate article, the second tensioner means arranged on the vessel proximate to the spooling-off region.

3. The apparatus of claim 1, wherein an axis of rotation of the cylindrical body is substantially horizontal.

4. The apparatus of claim 1, wherein the plurality of individual guiding means are arranged non-parallel with a rotational plane of the cylindrical body and exhibit a pitch angle different from zero degrees.

5. The apparatus of claim 1, wherein the plurality of individual guiding means comprise:
lifting means for lifting a portion of the elongate article which is subjected to the guiding means off from the cylindrical contacting surface and for subsequently allowing the elongate article to resume contact with the cylindrical contacting surface.

6. The apparatus of claim 1, further comprising:
a plurality of traction means for the elongate article, the plurality of traction means being arranged at intervals around the entire cylindrical body.

7. The apparatus of claim 6, wherein the plurality of traction means comprise:
a plurality of ridges releasably arranged on the cylindrical contacting surface,
wherein at least a portion of an outer structure of the elongate article is elastically deformed when subjected to the plurality of ridges when the apparatus is in operation.

8. The apparatus of claim 1, wherein the cylindrical contacting surface comprises:
a plurality of receptacles arranged around the entire circumference of the cylindrical body, the plurality of receptacles being configured for releasably receiving the plurality of support elements for the elongate article.

9. The apparatus of claim 8, wherein the plurality of support elements are interconnected to form an endless belt which is wrapped a number of turns around the entire cylindrical body.

10. The apparatus of claim 9, further comprising:
a first and a second guide funnel for the endless belt,
the first and second guide funnels being arranged proximate to the cylindrical body and at an axial distance apart,
wherein the endless belt is temporarily lifted off the cylindrical body and moved in a cylindrical body axial direction before the endless belt is re-attached to the cylindrical body.

11. The apparatus of claim 1, wherein the plurality of support elements are configured for arrangement on the cylindrical contacting surface for providing support for the elongate article.

12. The apparatus of claim 11, wherein the plurality of support elements are connected in an end-to-end relationship to form an endless support belt wrapped around the cylindrical body.

13. The apparatus of claim 12, further comprising:
a take-off section, wherein a portion of the endless support belt is temporarily lifted off the cylindrical contacting surface by means of a guide structure, shifted in an axial direction of the cylindrical body, and brought back to the cylindrical contacting surface,
wherein the guide means has a low profile for enabling large objects to pass by.

14. The apparatus of claim 11, wherein each of the plurality of support elements comprises a v-shaped profile for supporting at least a part of the elongated article.

15. The apparatus of claim 1, wherein the spooling-on region and the spooling-off region are on a same side of an axis of rotation of the cylindrical body.

16. A vessel for laying an elongate article, the vessel comprising a hull and a deck, and further comprising:
a cylindrical body rotatably supported on the vessel, the cylindrical body comprising:
driving means for controlling a rotation of the cylindrical body;
a spooling-on region and a spooling-off region for the elongate article; and
a cylindrical contacting surface for interaction with at least a portion of the elongate article either directly or via a plurality of support elements, the cylindrical contacting surface being configured to support the first portion;
a first tensioner means for the elongate article, the first tensioner means arranged on the floating vessel between the spooling-on region and a storage area for the elongate article; and
a guiding apparatus arranged on the vessel proximate to the cylindrical contacting surface,
wherein the guiding apparatus is arranged and configured to control movement of the portion of the elongate article interacting with the cylindrical contacting surface between the spooling-on region and the spooling-off region, and
wherein the guiding apparatus comprises a plurality of individual guiding means, each of the plurality of individual guiding means being configured to control a movement of one of a plurality of turns of the elongate article around the cylindrical contacting surface.

17. The vessel of claim 16, further comprising a storage area for a plurality of storage spools for portions of the elongate article, the storage area located upstream of the spooling-on region.

18. A method of laying an elongate article from a vessel, comprising:
arranging a section of the elongate article fully around a cylindrical contacting surface of a cylindrical body rotatably supported on the vessel;
feeding a first portion of the elongate article into a body of water below the vessel and suspending said first portion by the cylindrical body and a tensioner;
rotating the cylindrical body and operating the tensioner to lower the elongate article into the water; and
using a guiding apparatus to effect a controlled movement of the section of the elongate article that is arranged on the cylindrical contacting surface,
wherein the controlled movement is in an axial direction of the cylinder and at increments per rotation of the cylindrical body that corresponds to a transverse dimension of the elongate article, and
wherein the guiding apparatus comprises a plurality of individual guiding means, each of the plurality of individual means being configured to control a movement of one of a plurality of turns of the elongate article around the cylindrical contacting surface.

19. The method of claim 18, wherein arranging the portion of the elongate article comprises:

winding of the elongate article one or more turns around the cylindrical contacting surface of the cylindrical body.

20. The method of claim 18, wherein the elongate article is spooled off of one of a plurality of storage spools on a deck area on the vessel and onto the cylindrical body, without intermediate storage.

21. The method of claim 18, wherein an endless belt of cradles is wound a number of turns around the cylindrical body, providing support for the elongate article.

22. The method of claim 21, further comprising temporarily removing the endless belt off of the cylindrical body at a take-off section.

* * * * *